(12) United States Patent
Toyamasaki

(10) Patent No.: US 10,341,511 B2
(45) Date of Patent: Jul. 2, 2019

(54) DATA TRANSFER APPARATUS, IMAGE FORMING APPARATUS, AND IMAGE READING APPARATUS

(71) Applicant: KYOCERA Document Solutions Inc., Osaka (JP)

(72) Inventor: Kenta Toyamasaki, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/023,489

(22) Filed: Jun. 29, 2018

(65) Prior Publication Data
US 2019/0020772 A1    Jan. 17, 2019

(30) Foreign Application Priority Data

Jul. 14, 2017  (JP) ................. 2017-138530

(51) Int. Cl.
| | |
|---|---|
| *H04N 1/00* | (2006.01) |
| *H04L 29/08* | (2006.01) |
| *H04N 1/32* | (2006.01) |
| *H04L 29/12* | (2006.01) |
| *G06F 3/12* | (2006.01) |
| *H04L 12/58* | (2006.01) |
| *G06F 3/0481* | (2013.01) |

(52) U.S. Cl.
CPC ....... *H04N 1/00411* (2013.01); *G06F 3/1204* (2013.01); *G06F 3/1231* (2013.01); *H04L 51/28* (2013.01); *H04L 61/106* (2013.01); *H04L 67/36* (2013.01); *H04N 1/00824* (2013.01); *H04N 1/32037* (2013.01); *G06F 3/04817* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0086023 A1* | 4/2007 | Kadota | ............. | H04N 1/32064 358/1.1 |
| 2011/0051186 A1* | 3/2011 | Katsuda | ............. | H04N 1/00244 358/1.15 |
| 2011/0235110 A1* | 9/2011 | Tani | ....................... | G03G 15/00 358/1.15 |

FOREIGN PATENT DOCUMENTS

JP        2015-028805 A    2/2015

* cited by examiner

*Primary Examiner* — Helen Zong
(74) *Attorney, Agent, or Firm* — IP Business Solutions, LLC

(57) ABSTRACT

A data transfer apparatus includes a display unit, a touch panel, a storage unit, a data transfer unit, a display controller, and a controller. The display controller causes the display unit to display a list showing names of data transfer destinations stored in the storage unit, when causing the display unit to display a screen urging a user to select a data transfer destination. The controller causes the data transfer unit, when the touch panel receives from the user, in a case where a plurality of the destinations are selected out of the list, a predetermined determination instruction applicable to a data transfer method, with respect to one transfer method selected for one selected destination, to transfer the data to the selected destinations, using the one transfer method as the method of the data transfer to other destinations than the one destination.

7 Claims, 8 Drawing Sheets

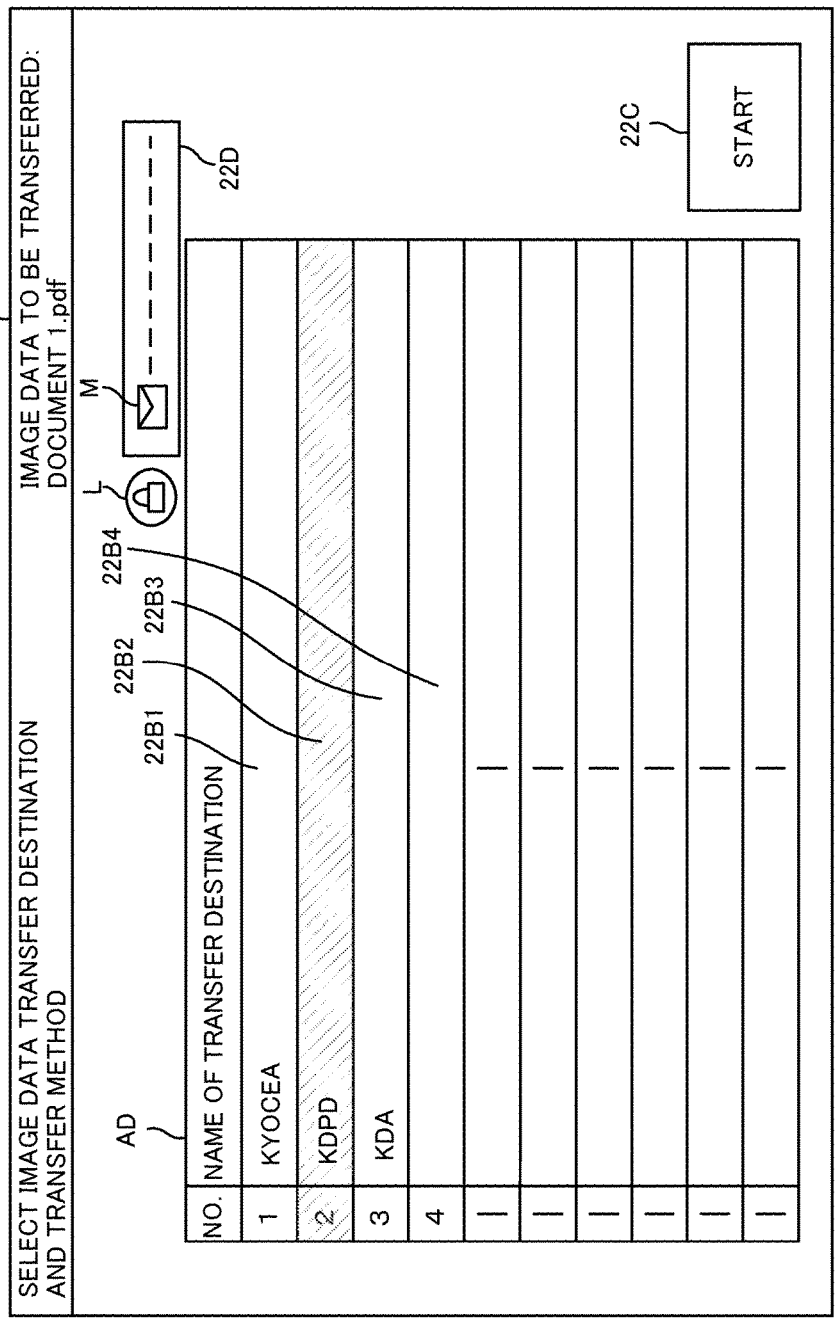

DATA TRANSFER APPARATUS, IMAGE FORMING APPARATUS, AND IMAGE READING APPARATUS

INCORPORATION BY REFERENCE

This application claims priority to Japanese Patent Application No. 2017-138530 filed on Jul. 14, 2017, the entire contents of which are incorporated by reference herein.

BACKGROUND

The present disclosure relates to a data transfer apparatus configured to present an operation screen to a user and receive an instruction from the user, to thereby transfer data to a designated destination, an image forming apparatus including the data transfer apparatus, and an image reading apparatus including the data transfer apparatus.

The data transfer apparatus incorporated in the image forming apparatus normally has a touch panel function, and an operation status of the apparatus, soft buttons for receiving instructions from the user, and various messages are displayed on the touch panel.

In addition, a data transfer apparatus has been proposed that transfers image data of a source document, for example acquired through a reading operation performed by a document reading unit provided in the image forming apparatus, to a destination designated by the user. For such a data transfer apparatus, a technique to facilitate the use thereof has been proposed, for example by displaying, on the display unit, a list showing a plurality of items of transmission data including names of the destination of the image data and the destination address, and changing the number of pages of the list to be displayed on the display unit, according to the instruction made by the user regarding the destination data, thereby allowing the user to easily and intuitively designate the desired destination.

SUMMARY

The disclosure proposes further improvement of the foregoing technique.

In an aspect, the disclosure provides a data transfer apparatus configured to receive an input of a data transfer destination from a user. The data transfer apparatus includes a display unit, a touch panel, a storage unit, a data transfer unit, a display controller, and a controller. The touch panel is located on a display screen of the display unit, and configured to receive an instruction of the user. The storage unit contains, beforehand, a name of the data transfer destination in association with each transfer destination address of each type of methods of the data transfer. The data transfer unit transfers the data to the data transfer destination. The display controller controls an operation of the display unit, and causes the display unit, when the touch panel receives a data transfer instruction from the user, to display a screen urging the user to select the data transfer destination and the method of the data transfer to the destination. The controller causes the data transfer unit, when the touch panel receives the instruction from the user to select the data transfer destination and the method of the data transfer to the destination, to transfer the data to the selected destination, by the selected transfer method. The display controller causes the display unit to display a list showing a plurality of the names of a plurality of the destinations stored in the storage unit, when causing the display unit to display the screen urging the user to select the data transfer destination. The controller causes the data transfer unit, when the touch panel receives from the user, in a case where the plurality of the destinations are selected out of the list, a predetermined determination instruction applicable to the data transfer method, with respect to one transfer method selected for one selected destination, to transfer the data to the selected destinations, using the one transfer method as the method of the data transfer to other destinations than the one destination.

In another aspect, the disclosure provides an image forming apparatus including the foregoing data transfer apparatus, and an image forming unit that forms an image on a recording medium.

In still another aspect, the disclosure provides an image reading apparatus including the foregoing data transfer apparatus, and a document reading unit that reads a source document. The data transfer apparatus is configured to transfer image data of the source document acquired through a reading operation of the document reading unit.

BRIEF DESCRIPTION OF THE DRAWINGS

FIG. 8 is a schematic drawing illustrating still another example of the screen displayed on the display unit.

DETAILED DESCRIPTION

Figure 1:
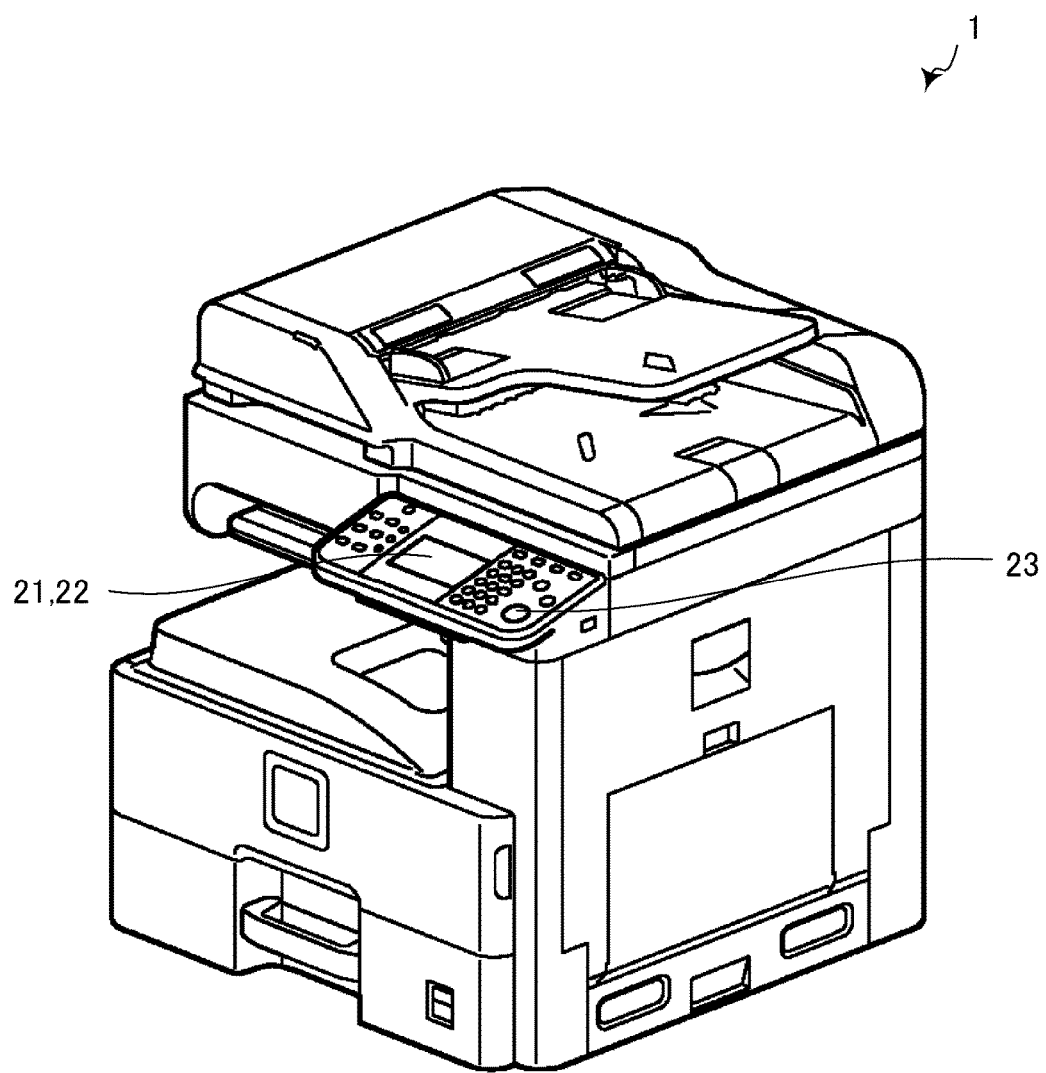
FIG. 1 is a perspective view showing an image forming apparatus according to an embodiment of the disclosure.

Hereafter, a data transfer apparatus according to an embodiment of the disclosure, an image forming apparatus including the data transfer apparatus, and an image reading apparatus including the image forming apparatus will be described, with reference to the drawings. FIG. 1 is a perspective view showing the image forming apparatus according to the embodiment of the disclosure.

The image forming apparatus 1 according to the embodiment may be, for example, an electrophotographic image forming apparatus that utilizes a toner as developing agent, or an ink jet printer that utilizes ink. The image forming apparatus 1 includes a display unit 21 and a touch panel 22, formed as an integral component, located on the front face of the main body. The image forming apparatus 1 is a multifunction peripheral configured to execute a plurality of functions including, for example, a copying function, a printing function, a scanning function, and a facsimile function.

The display unit 21 includes a display screen, for example constituted of a liquid crystal display (LCD), to display operation procedures, messages, and operation buttons (soft buttons) under control of a display controller to be subsequently described.

The touch panel 22 is located on the display screen of the display unit 21, and unified with the display unit 21. The touch panel 22 is utilized to receive an instruction from the user. The touch panel 22, for example including a resistive film, detects the position (coordinate) where the user has contacted, and outputs the coordinate to a control unit 10 to be subsequently described. The control unit 10 identifies the position where the user has made the contact, on the basis of the position information outputted from the touch panel 22, and performs the operation accordingly.

In addition, operation buttons including hard buttons such as a start button 23, an on/off button, a stop/clear button, and a numeric keypad are provided in the vicinity of the display unit 21 and the touch panel 22. These operation buttons are used to input the instruction from the user, by being pressed by the user. For example, the start button 23 is used to input, upon being pressed by the user, the instruction to start the operation of various functions such as copying and scanning (reading).

Figure 2:
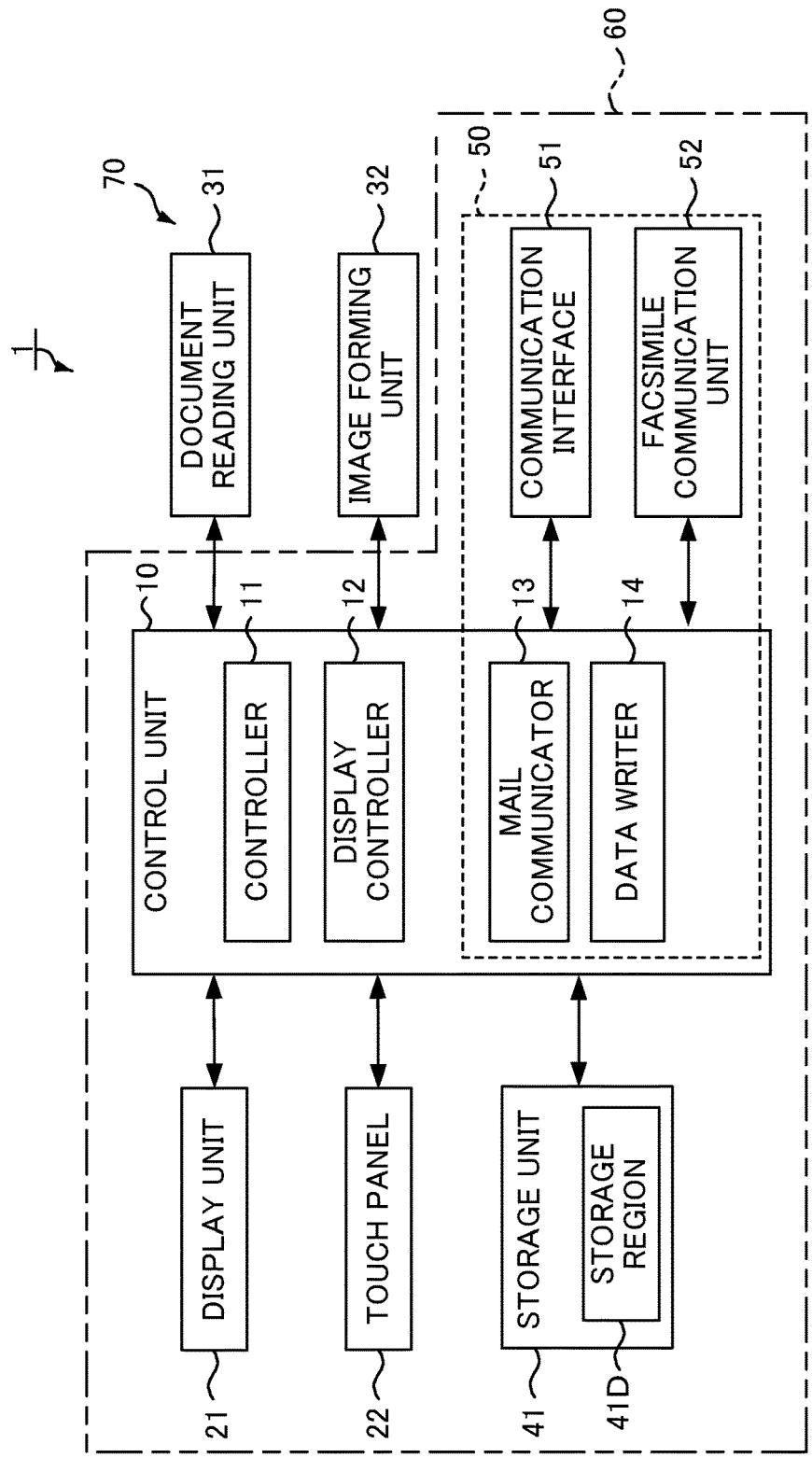
FIG. 2 is a functional block diagram showing an essential configuration of the image forming apparatus according to the embodiment of the disclosure.

FIG. 2 is a functional block diagram showing an essential configuration of the image forming apparatus according to the embodiment of the disclosure. The image forming apparatus 1 includes a control unit 10, the display unit 21, the touch panel 22, a document reading unit 31, an image forming unit 32, a storage unit 41, a communication interface 51, and a facsimile communicator 52. A data transfer apparatus 60 includes the display unit 21, the touch panel 22, the control unit 10, the storage unit 41, the communication interface 51, and the facsimile communicator 52. An image reading apparatus 70 includes the data transfer apparatus 60 and the document reading unit 31.

In a document reading operation of the image forming apparatus 1, the document reading unit 31 optically reads the image of a source document delivered from a non-illustrated document feeding unit, and generates image data of the source document through the reading operation.

In an image forming (printing) operation of the image forming apparatus 1, a controller of the control unit 10, to be subsequently described, causes the image forming unit 32 to perform a printing operation on a recording sheet, exemplifying the recording medium, supplied from a non-illustrated paper cassette, according to the image data generated through the document reading operation, thereby forming the image on the recording sheet.

The document reading unit 31 includes a non-illustrated reading mechanism having a light emitter and a CCD sensor. The document reading unit 31 is configured to read an image from the source document by irradiating the source document with the light emitter and receiving the reflected light with the CCD sensor, and to generate image data, under the control of the control unit 10.

The image forming unit 32 forms the image based on, for example, the image data read by the document reading unit 32. To be more detailed, when the image forming unit 32 performs color printing for example, an image forming subunit for magenta, an image forming subunit for cyan, an image forming subunit for yellow, and an image forming subunit for black in the image forming unit 32 each form a toner image on a photoconductor drum on the basis of the image formed of the corresponding color component, through charging, exposing, and developing processes, and such toner image is transferred onto an intermediate transfer belt (not shown) via a primary transfer roller (not shown).

The toner images of the respective colors are superposed at an adjusted timing when transferred onto the intermediate transfer belt, so as to form a colored toner image. A secondary transfer roller transfers the colored toner image formed on the surface of the intermediate transfer belt onto the recording sheet transported along a transport route from the non-illustrated paper cassette, at a nip region of a drive roller engaged with the intermediate transfer belt. Then a fixing unit fixes the toner image on the recording sheet by thermal compression. The recording sheet having the colored image formed and fixed thereon is discharged to an output tray.

The storage unit 41 is a large-capacity storage device such as a hard disk drive (HDD) and a solid state drive (SSD). The storage unit 41 contains, beforehand, names of the image data transfer destination and the addresses of the destination, in association with each other, with respect to each type of the image data transfer method. The storage unit 41 also includes a storage region 41D where the image data is to be written.

The communication interface 51 includes a communication module such as a LAN board, and performs data communication with information processing devices or the like under the control of the controller, through a network to which the communication interface 51 is connected. Here, the communication interface 51 is an example of a data transfer unit 50 that transfers the image data to the image data transfer destination, and configured to transfer the image data, for example, by communication through the mentioned network, to an external device such as the information processing device, to which an IP address, stored in advance in the storage unit 41 as destination address, is allocated.

The facsimile communicator 52 executes the functions necessary for the facsimile communication, to transmit and receive the image data to and from an external device such as a facsimile machine, through a public telephone line. The facsimile communicator 52 is also an example of the data transfer unit 50, and transfers the image data by facsimile communication, for example to the external device such as the facsimile machine, to which a facsimile number, stored in advance in the storage unit 41 as the destination address, is allocated.

The control unit 10 includes a controller 11, a display controller 12, a mail communicator 13, and a data writer 14.

The control unit 10 includes a processor, a random-access memory (RAM), a read-only memory (ROM), and so forth. The processor is, for example, a central processing unit (CPU), a MPU, an ASIC, or the like. The control unit 10 acts as the controller 11, the display controller 12, the mail communicator 13, and the data writer 14, when the processor executes a program stored in the storage unit 55. Here, the controller 11, the display controller 12, the mail communicator 13, and the data writer 14 may each be constituted in the form of a hardware circuit, instead of being performed according to the program. This also applies to other embodiments, unless otherwise specifically noted.

The controller 11, which serves to control the overall operation of the image forming apparatus 1, is connected to the display unit 21, the touch panel 22, the document reading unit 31, the image forming unit 32, the storage unit 41, the communication interface 51, and the facsimile communicator 52, and controls the operation of the mentioned components.

The display controller 12 is configured to control the displaying operation performed by the display unit 51.

The mail communicator 13 is also an example of the data transfer unit 50, and transfers the image data by mail communication, for example to the external device such as the information processing device, to which a mail address, stored in advance in the storage unit 41 as the destination address, is allocated.

The data writer 14 is also an example of the data transfer unit 50, and transfers the image data, for example by writing the data in the storage region 41D of the storage unit 41, indicated by position information stored in advance in the storage unit 41 as the destination address.

The display controller 12 causes the display unit 21, when the touch panel 22 receives the instruction from the user to transfer the image data, to display a screen urging the user to select the image data transfer destination, and the method of image data transfer to the destination.

The display controller 12 also causes the display unit 21, when causing the display unit 21 to display the screen urging the user to select the image data transfer destination, to display a list, for example an address book, including the names of the destination stored in the storage unit 41.

The controller 11 causes the data transfer unit 50, when the touch panel 22 receives the instruction from the user to select the image data transfer destination, and the method of image data transfer to the destination, to transfer the image data to the selected destination, by the selected transfer method.

For example, when the touch panel 22 receives the instruction from the user to select the image data transfer destination, and the mail communication as the image data transfer method, the controller 11 acquires the mail address of the selected destination from the storage unit 41, and causes the mail communicator 13 to transfer the mail accompanied by the image data, to the external device to which the acquired mail address is allocated.

In addition, when the touch panel 22 receives the instruction from the user to select the image data transfer destination, and the network communication as the image data transfer method, the controller 11 acquires the IP address of the selected destination from the storage unit 41, and causes the communication interface 51 to transfer the image data to the external device, to which the acquired IP address is allocated.

Further, when the touch panel 22 receives the instruction from the user to select the image data transfer destination, and the facsimile communication as the image data transfer method, the controller 11 acquires the facsimile number of the selected destination from the storage unit 41, and causes the facsimile communicator 52 to transfer the image data to the external device, to which the acquired facsimile number is allocated.

Further, when the touch panel 22 receives the instruction from the user to select the image data transfer destination, and the data writing as the image data transfer method, the controller 11 acquires the position information of the selected destination from the storage unit 41, and causes the data writer 14 to write the image data in the storage region 41D, indicated by the acquired position information.

Still further, in the case where a plurality of destinations are selected out of the address book (list), the controller 11 causes, when the touch panel 22 receives from the user a predetermined determination instruction applicable to the image data transfer method, with respect to one transfer method selected for one selected destination, the data transfer unit 50 (one of mail communicator 13, communication interface 51, facsimile communicator 52, and data writer 14) to transfer the image data to the plurality of destinations, by the one transfer method, without the process through which the user selects the image data transfer method for other destinations than the one destination, on the touch panel 22.

Figure 6:
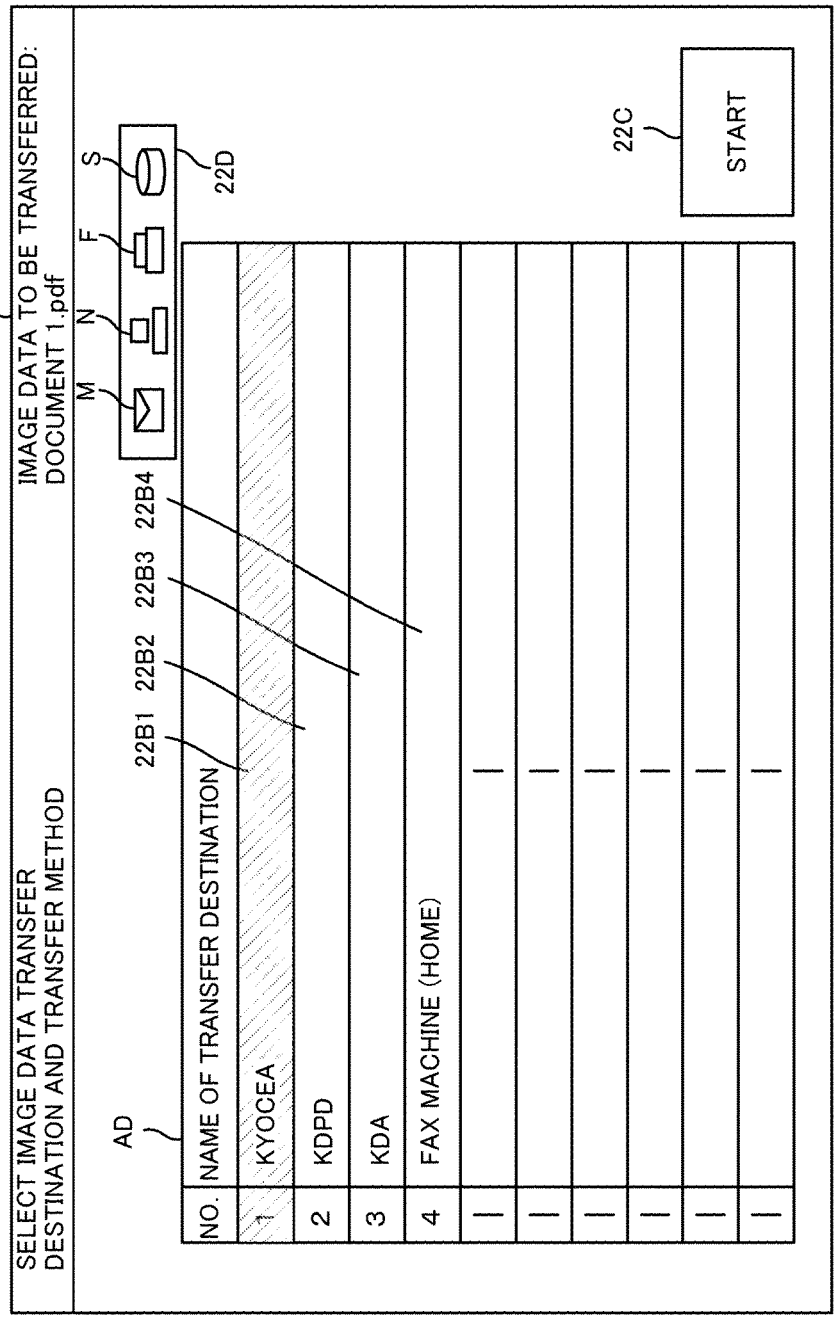
FIG. 6 is a schematic drawing illustrating still another example of the screen displayed on the display unit.

The display controller 12 causes the display unit 21 to display icons representing the respective transfer methods of the image data, when causing the display unit 21 to display the screen urging the user to select the method of image data transfer to the destination. For example, the display controller 12 causes the display unit 21 to display, as illustrated in FIG. 6 to be subsequently referred to, an icon M representing the mail communication, an icon N representing the network communication, an icon F representing the facsimile communication, and an icon S representing the data writing.

When the user presses one of the mentioned icons on the touch panel 22, it is decided that the instruction to select the image data transfer method corresponding to the pressed icon has been made. Further, when the user holds down the icon on the touch panel 22 equal to or longer than a predetermined time (e.g., 10 seconds), it is decided that the predetermined determination instruction has been received, with respect to the image data transfer method corresponding to the icon that has been held down.

Figure 7:
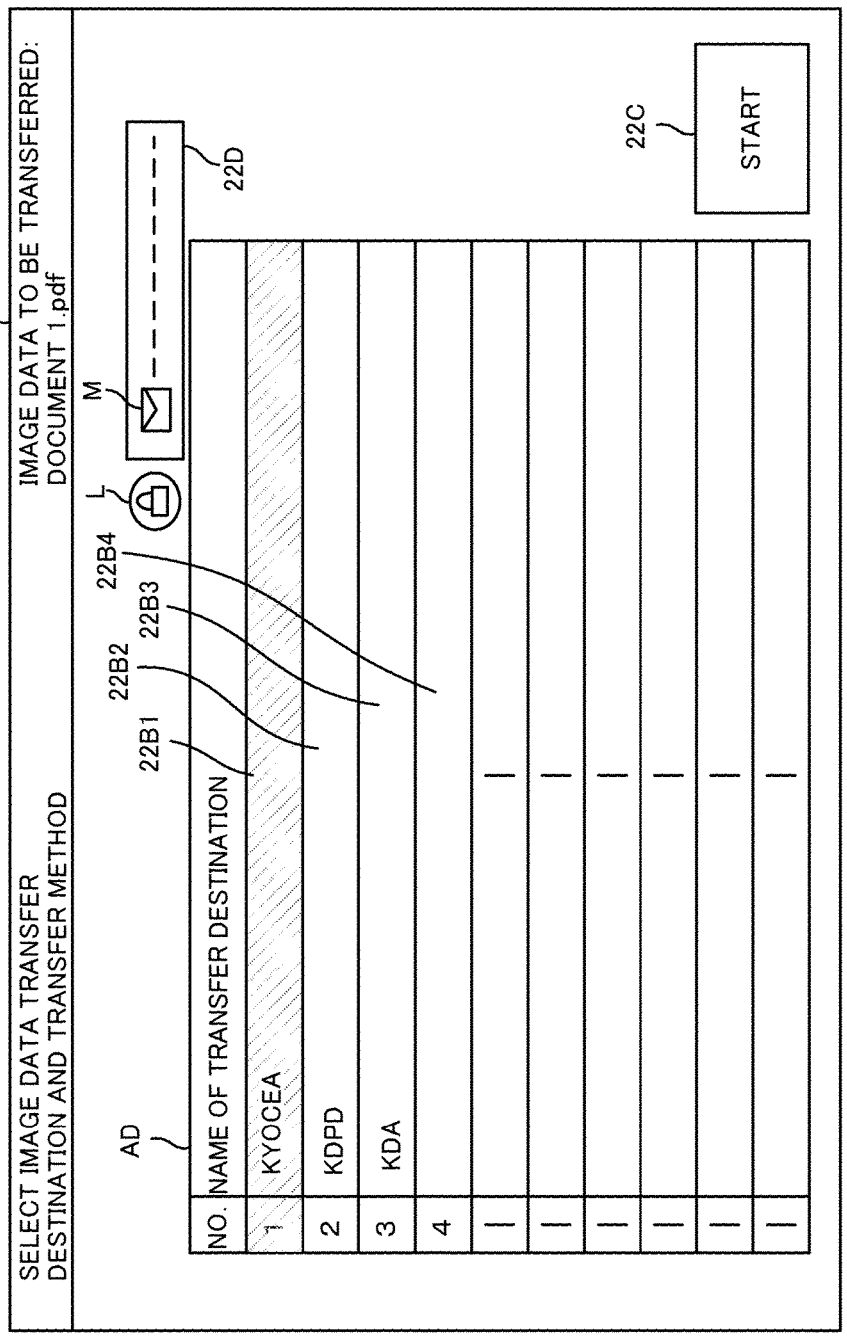
FIG. 7 is a schematic drawing illustrating still another example of the screen displayed on the display unit.

When the touch panel 22 receives the determination instruction with respect to one transfer method of the image data, the display controller 12 causes the display unit 21 to display a predetermined lock icon L indicating that the image data transfer method is fixed to the one transfer method, as illustrated in FIG. 7 to be subsequently referred to.

In addition, upon causing the display unit 21 to display the lock icon, the display controller 12 causes the display unit 21 to display only the icon corresponding to the one data transfer method fixed by the lock icon.

Further, when the touch panel 22 receives the determination instruction with respect to one transfer method of the image data, the display controller 12 causes the display unit 21 to display, in the address book, only the destinations, the address of which corresponding to the one image data transfer method is stored in the storage unit 41.

Figure 3:
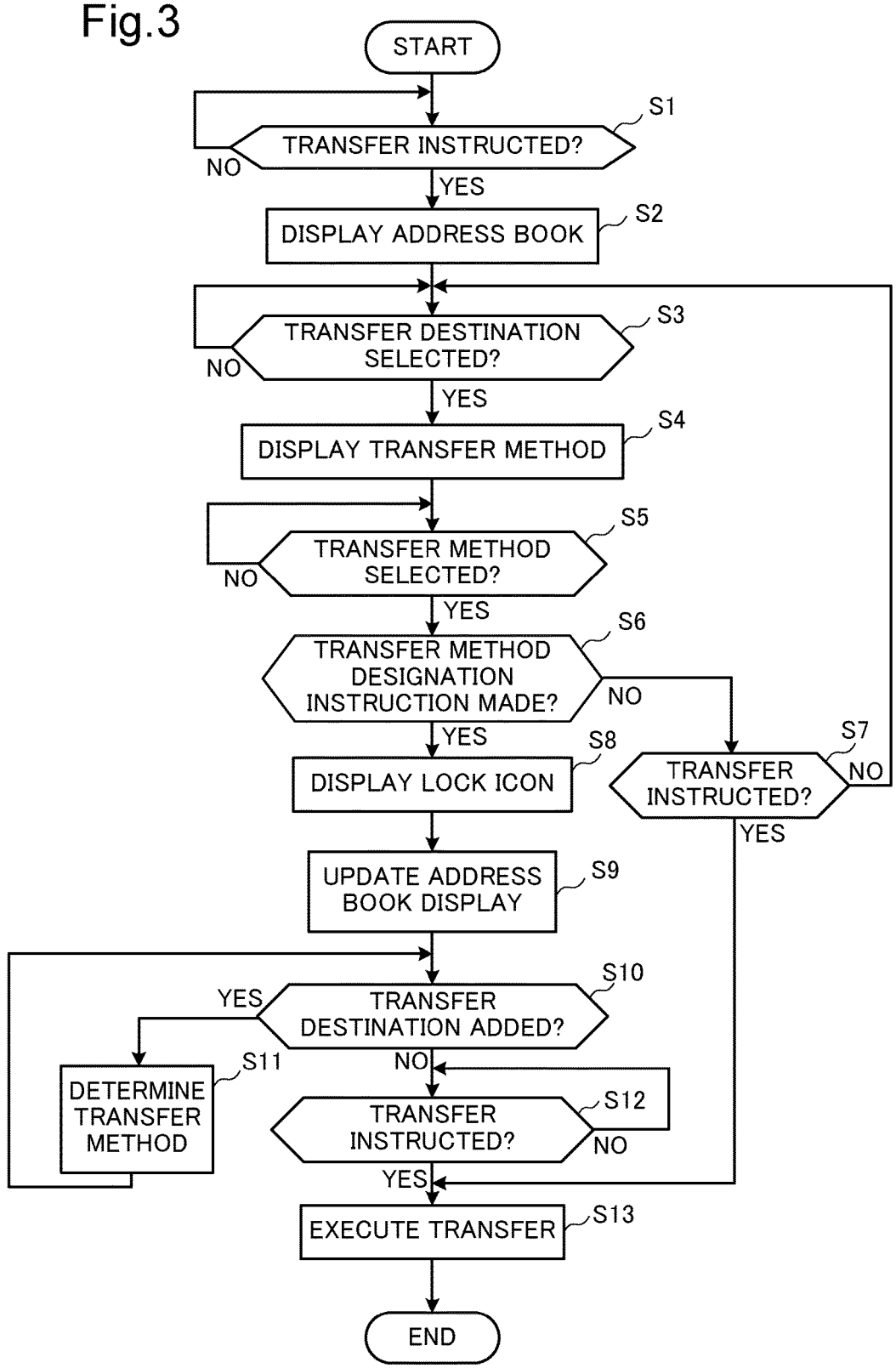
FIG. 3 is a flowchart showing an operation performed by the image forming apparatus.

Referring now to FIG. 3, an operation of the image forming apparatus 1 according to the embodiment will be described in detail. FIG. 3 is a flowchart showing an operation performed by the image forming apparatus. The following description will primarily focus on the case of transferring the image data of a source document, acquired through the reading operation of the document reading unit 31 in the image forming apparatus 1, to a destination selected by the user.

Figure 4:
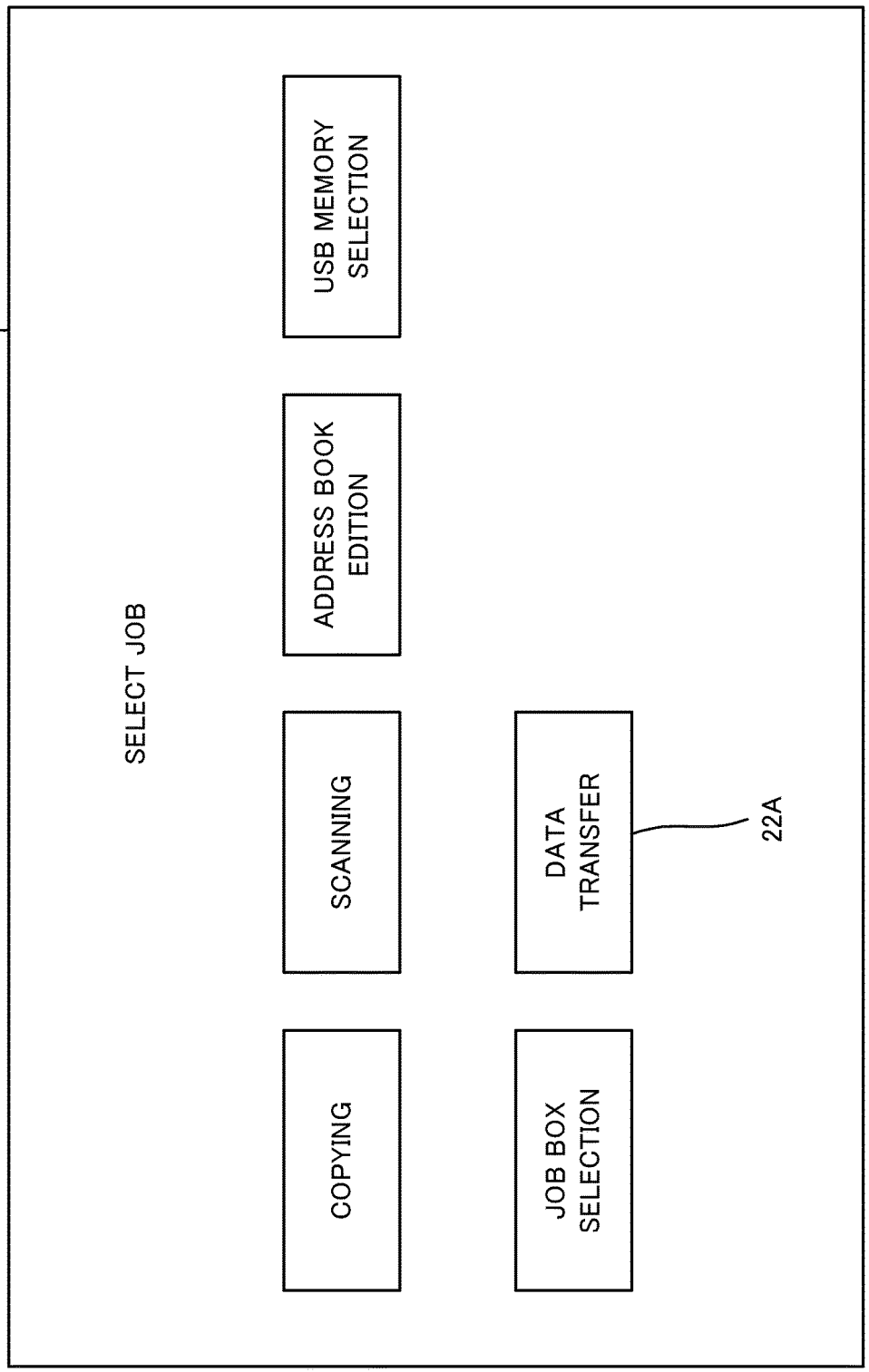
FIG. 4 is a schematic drawing illustrating an example of a screen displayed on a display unit.

As shown in FIG. 3, the controller 11 decides whether the touch panel 22 has received an instruction from the user to transfer the image data (S1). For example, the controller 11 decides whether the instruction to transfer the image data has been made, by detecting whether a data transfer key 22A has been pressed by the user, after the display controller 12 causes the display unit 21 to display the screen urging the user to input the instruction, as shown in FIG. 4. Unless a press of the data transfer key 22A is detected through the touch panel 22 (NO at S1), the controller 11 sets the image forming apparatus 1 to a standby mode, instead of proceeding to step S2.

Figure 5:
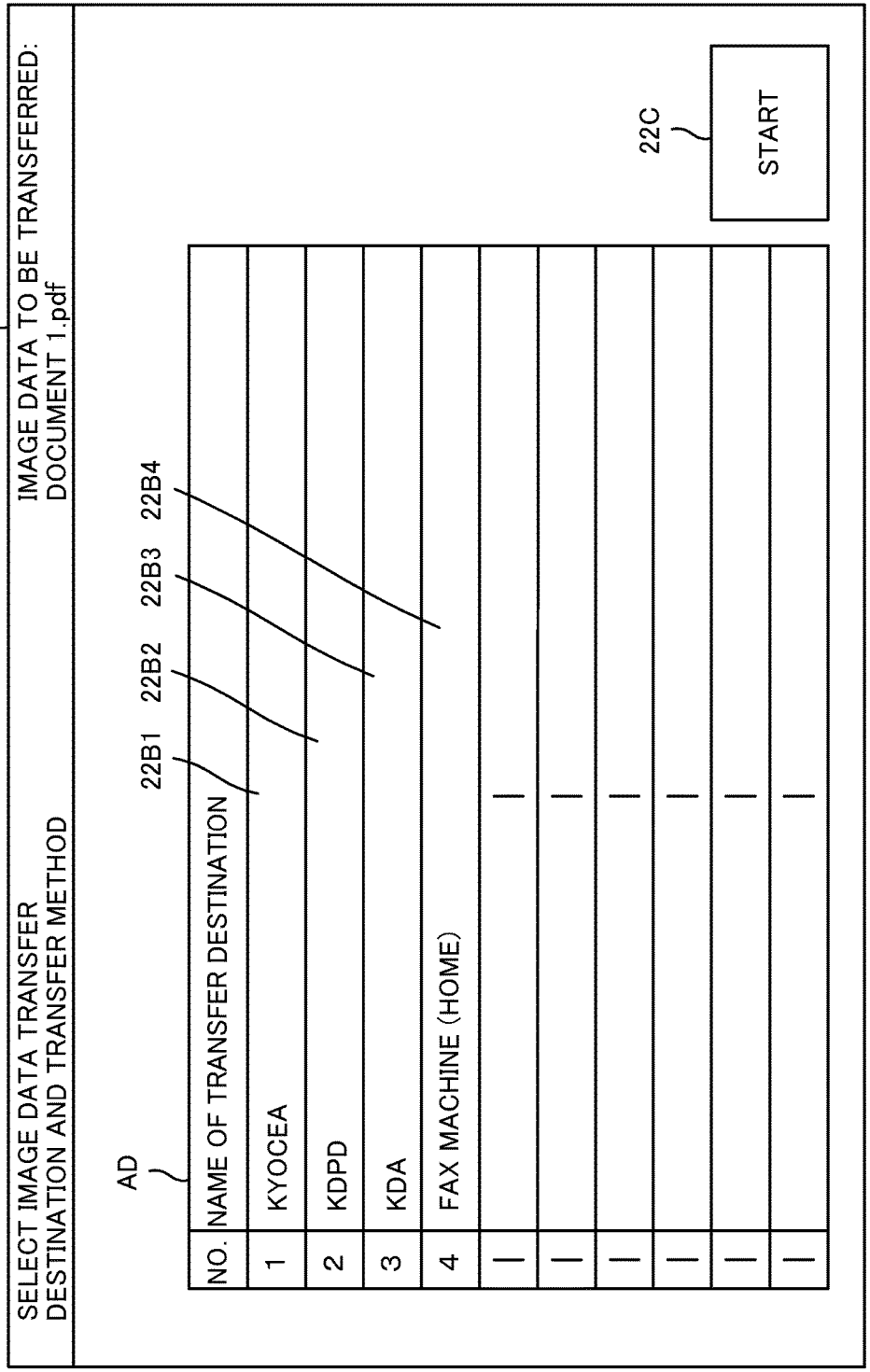
FIG. 5 is a schematic drawing illustrating another example of the screen displayed on the display unit.

In contrast, upon detecting through the touch panel 22 that the data transfer key 22A has been pressed by the user (YES at S1), the controller 11 decides that the instruction to transfer the image data has been made. Then the display controller 12 causes the display unit 21 to display an address book AD, for example as illustrated in FIG. 5 (S2). As illustrated in FIG. 5, the address book AD presents a list of the destinations stored in the storage unit 41 including, for example, "Kyocea", "KDPD", "KDA", and "facsimile machine (home)".

The address book AD also includes a selection field 22B1, for allowing the user to select "Kyocea" as the destination. Likewise, the address book AD includes a selection field 22B2 corresponding to "KDPD", a selection field 22B3 corresponding to "KDA", and a selection field 22B4 corresponding to "facsimile machine (home)". Then when the pressing of the user, for example on the selection field 22B1, is detected through the touch panel 22, the display controller 12 causes the display unit 21 to display the icons each representing the transfer method capable of transferring the image data, on the basis of the address of "Kyocea" stored in the storage unit 41, with respect to each type of the transfer method, as will be subsequently described in further detail. Thus, the display controller 12 causes the display unit 21 to display the screen urging the user to select the image data transfer destination, and the method of image data transfer to the destination, by presenting the address book AD to the user. Here, the address book AD also includes the name of the image data to be transferred, for example "Document 1.pdf", as illustrated in the display screen of FIG. 5.

The controller 11 then decides whether the touch panel 22 has received an instruction from the user to select the image data transfer destination (S3). For example, unless a press of any of the selection fields 22B1 to 22B4 shown in the display screen of FIG. 5 is detected through the touch panel 22 (NO at S3), the controller 11 sets the image forming apparatus 1 to the standby mode, instead of proceeding to step S4.

In contrast, upon detecting through the touch panel 22 that one of the selection fields 22B1 to 22B4 has been pressed by the user (YES at S3), the controller 11 decides that the image data transfer destination has been selected by the user. The display controller 12 also looks up the storage unit 41, to thereby cause the display unit 21 to display the method of image data transfer to the selected destination (S4). For example, the display controller 12 recognizes, when the selection of the selection field 22B1 by the user is detected through the touch panel 22, as indicated by hatching in the display screen of FIG. 6, that the addresses, such as the mail address, the IP address, the facsimile number, and the position information of the destination "Kyocea" corresponding to the selection field 22B1, are stored in the storage unit 41. Then the display controller 12 causes the display unit 21 to display the selection field 22D including the icon M representing the mail communication, the icon N representing the network communication, the icon F representing the facsimile communication, and the icon S representing the data writing, as illustrated in the display screen of FIG. 6, to allow the user to select the image data transfer method, through the selection field 22D.

The controller 11 then decides whether the touch panel 22 has received the instruction from the user to select the image data transfer method (S5). For example, in the case where the selection of any of the icon M, the icon N, the icon F, and the icon S in the selection field 22D has not been detected through the touch panel 22 (NO at S5), the controller 11 sets the image forming apparatus 1 to the standby mode, instead of proceeding to step S6.

In contrast, upon detecting through the touch panel 22 that one of the icon M, the icon N, the icon F, and the icon S has been pressed by the user (YES at S5), the controller 11 decides that the image data transfer method has been selected by the user. Further, the controller 11 detects whether the user has held down, on the touch panel 22, one of the icon M, the icon N, the icon F, and the icon S equal to or longer than the predetermined time, thereby deciding whether the touch panel 22 has received the determination instruction with respect to the image data transfer method (S6).

Unless the controller 11 detects through the touch panel 22 that the user has held down any of the icon M, the icon N, the icon F, and the icon S equal to or longer than the predetermined time (NO at S6), the controller 11 decides that the user has not inputted the determination instruction. The controller 11 then decides whether the user has instructed to transfer the image data (S7). For example, the controller 11 detects whether the user has pressed the start key 22C on the touch panel 22, in the display screen illustrated in FIG. 6, thereby deciding whether the user has instructed to transfer the image data.

Unless the press of the start key 22C by the user is detected through the touch panel 22 (NO at S7), the controller 11 returns to step S3 and repeats the same operation. In contrast, upon detecting through the touch panel 22 that the user has pressed the start key 22C (YES at S7), the controller 11 proceeds to step S13, which will be subsequently described.

Further, in the case where the controller 11 detects through the touch panel 22 that the user has held down one of the icon M, the icon N, the icon F, and the icon S equal to or longer than the predetermined time (YES at S6), the controller 11 decides that the user has inputted the determination instruction. For example, when the controller 11 detects through the touch panel 22 that the user has held down the icon M equal to or longer than the predetermined time, the controller 11 decides that the user has instructed to transfer the image data by mail communication, to the destination "Kyocea" selected at step S3 and, further, that the user has instructed to fix the transfer method of the image data to the destination to be thereafter selected by the user, to the mail communication. Then the display controller 12 causes the display unit 21 to display the predetermined lock icon L, indicating that the image data transfer method is fixed to the mail communication according to the determination instruction made at step S6, in the vicinity of the selection field 22D, for example as shown in FIG. 7 (S8). Further, upon causing the display unit 21 to display the lock icon L as illustrated in the display screen of FIG. 7, the display controller 12 also causes the display unit 21 to display only the icon M, representing the mail communication which is the fixed method indicated by the lock icon L, in the selection field 22D in the display screen.

Thereafter, the display controller 12 causes the display unit 21 to update the display of the address book AD (S9). For example, the display controller 12 looks up the storage unit 41, and displays only the destinations, the mail address of which, corresponding to the mail communication designated by the determination instruction at step S6, is stored in the storage unit 41, out of the destinations stored in the storage unit 41 (i.e., destinations included in the address book AD). In other words, the display controller 12 erases "facsimile machine (home)", the mail address of which is not stored in the storage unit 41, from selection field 22B4 in the address book AD, for example as shown in the display screen of FIG. 7, and restricts the destination "facsimile machine (home)" from being displayed, in the address book AD that has been updated.

Then the controller 11 decides whether the user has selected an additional image data transfer destination (S10). For example, the controller 11 detects whether the selection field 22B2 or the selection field 22B3 has been selected by the user, thereby deciding whether the image data transfer destination has been added. Upon detecting through the touch panel 22 that, for example, the selection field 22B2 has been selected by the user, as hatched in the display screen shown in FIG. 8 (YES at S10), the controller 11 decides that the destination "KDPD" pressed in the selection field 22B2 has been selected as the image data transfer destination. Then the controller 11 determines that the mail communication, designated by the determination instruction at step S6, is adopted as the method of image data transfer to the destination "KDPD", without the process through which the user selects the image data transfer method, on the touch panel 22 (S11). The display controller 12 causes the display unit 21 to display the icon M and the lock icon L, and the process returns to step S10 and the same operation is repeated.

In the case where the user has not selected either of the selection field 22B2 and the selection field 22B3 on the touch panel 22 (NO at S10), the controller 11 detects whether the user has pressed the start key 22C on the touch panel 22, thereby deciding whether the user has instructed to transfer the image data (S12).

In the case where the user has not pressed the start key 22C on the touch panel 22 (NO at S12), the controller 11 sets the image forming apparatus 1 to the standby mode, instead of proceeding to step S13.

In contrast, in the case where the user has pressed the start key 22C on the touch panel 22 (YES at S12), the controller 11 executes the transfer of the image data, to the destination selected at step S3 by the transfer method selected at step S5, or to the destinations selected at steps S3 and S10 by the transfer method designated by the determination instruction at step S6 (S13). Thus, in the case where the plurality of destinations are selected out of the address book AD, the controller 11 causes, when the touch panel 22 receives from the user the predetermined determination instruction applicable to the image data transfer method, with respect to one transfer method selected for one selected destination, the data transfer unit 50 to transfer the image data to the plurality of destinations, using the one transfer method as the method of image data transfer to other destinations than the one destination.

According to the embodiment, as described thus far, the storage unit 41 contains, beforehand, the names of the image data transfer destination and the destination addresses in association with each other, with respect to each type of a method of image data transfer. The display controller 12 causes the display unit 21 to display the address book AD including the names of the image data transfer destination stored in the storage unit, when causing the display unit 21 to display the screen urging the user to select the image data transfer destination. In the case where a plurality of destinations are selected out of the address book AD, the controller 11 causes, when the touch panel 22 receives from the user the predetermined determination instruction applicable to the image data transfer method, with respect to one transfer method selected for one selected destination, the data transfer unit 50 to transfer the image data to the plurality of destinations, using the one transfer method as the method of image data transfer to other destinations than the one destination. The mentioned arrangement according to the embodiment alleviates the burden on the user in the process of transferring the image data to a plurality of destinations, unlike the existing techniques according to the related art.

The existing image forming apparatuses generally possess a mail communication function, a network communication function, and a facsimile communication function, and are configured to transfer the image data to an external device using one of the mentioned communication functions, or transfer the image data to the storage region provided in the storage unit, for example a HDD, in the image forming apparatus, by writing the image data in the storage region.

However, with the mentioned technique of the related art, the user has to input the transfer method in the data transfer apparatus for each of the destinations, when the image data is to be transferred to the plurality of destinations. Therefore, it is difficult to alleviate the burden on the user, with the technique according to the related art.

In contrast, the arrangement according to the embodiment alleviates the burden on the user in the process of transferring the image data to a plurality of destinations.

In addition, data transfer unit 50 according to the embodiment includes the mail communicator 13, the communication interface 51, the facsimile communicator 52, and the data writer 14. Accordingly, in the case where, for example, the mail address, the IP address, the facsimile number, and the position information of the storage region 41D are stored in the storage unit 41 as the address of the destination, the user can select any of the mail communication, the network communication, the facsimile communication, and the data writing, as the transfer method of the image data. Therefore, improved user-friendliness can be provided to the user.

According to the embodiment, the display controller 12 causes the display unit 21 to display the icon M, the icon N, the icon F, or the icon S representing the type of the transfer method of the image data, when causing the display unit 21 to display the screen urging the user to select the method of image data transfer to the destination. In addition, when it is detected through the touch panel 22 that the user has pressed one of the icon M, the icon N, the icon F, and the icon S, it is decided that the instruction to select the image data transfer method, corresponding to the icon pressed by the user, has been inputted. Further, when it is detected through the touch panel 22 that the user has held down one of the icon M, the icon N, the icon F, and the icon S equal to or longer than the predetermined time, it is decided that the determination instruction has been inputted, for the image data transfer method corresponding to the icon that has been held down. Since different icons are thus displayed on the display unit 21 in accordance with the type of the image data transfer method, the user can easily select and input the image data transfer method.

According to the embodiment, in addition, when the touch panel 22 receives the determination instruction with respect to one of the transfer methods of the image data, the display controller 12 causes the display unit 21 to display the lock icon L indicating that the image data transfer method is fixed to the one designated by the determination instruction. Such an arrangement facilitates the user to visually recognize that the image data transfer method is fixed.

Further, according to the embodiment, upon causing the display unit 21 to display the lock icon L, the display controller 12 causes the display unit 21 to display only the icon representing the transfer method of the image data, which is the fixed method indicated by the lock icon L. Such an arrangement facilitates the user to visually recognize the type of the image data transfer method that has been fixed.

According to the embodiment, still further, when the touch panel 22 receives the determination instruction with respect to one transfer method of the image data, the display controller 12 causes the display unit 21 to display, in the address book AD, only the destinations, the address of which corresponding to the one image data transfer method is stored in the storage unit 41. Such an arrangement allows the user to easily and properly input the selection of the destination.

The configurations and processings described with reference to FIG. 1 to FIG. 8 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A data transfer apparatus configured to receive an input of data transfer destination from a user, the data transfer apparatus comprising:

a display unit;

a touch panel located on a display screen of the display unit, and configured to receive an instruction of the user;

a storage unit containing, beforehand, a name of the data transfer destination in association with each transfer destination address of each type of methods of the data transfer;

a data transfer unit that transfers the data to the data transfer destination;

a display controller that controls an operation of the display unit, and causes the display unit, when the touch panel receives a data transfer instruction from the user, to display a screen urging the user to select the data transfer destination and the method of the data transfer to the destination; and a controller that causes the data transfer unit, when the touch panel receives the instruction from the user to select the data transfer destination and the method of the data transfer to the destination, to transfer the data to the selected destination, by the selected transfer method, wherein the display controller causes the display unit to display a list showing a plurality of the names of a plurality of the destinations stored in the storage unit, when causing the display unit to display the screen urging the user to select the data transfer destination, when the touch panel receives an instruction to select one destination out of the plurality of the destinations included in the list, the display controller recognizes from the storage unit the transfer destination addresses of the one destination selected through the touch panel, and causes the display unit to display icons, together with the list, on a selection field displayed on a portion besides the list on the display unit as the screen urging the user to select the method of the data transfer to the destination, the icons respectively corresponding to each type of methods of the data transfer and to each address of the one destination recognized from the storage unit, when it is detected through the touch panel that the user has pressed one of the icons on the selection field, it is decided that the instruction to select the data transfer method, corresponding to the icon pressed by the user, has been inputted, and when it is detected through the touch panel that the user has held down the one icon on the selection field equal to or longer than a predetermined time, it is decided that a determination instruction has been inputted, for the data transfer method corresponding to the one icon that has been held down, when the touch panel receives the determination instruction with respect to one of the data transfer methods, the display controller causes the display unit to display, together with the list and the selection field, on a portion besides the list and the selection field displayed on the display unit, a predetermined lock icon indicating that the data transfer method is fixed to the one designated by the determination instruction, upon causing the display unit to display the lock icon, the display controller causes the display unit to display, on the selection field, only the icon representing the data transfer method that is the fixed method indicated by the lock icon, and causes the display unit not to display, on the selection field, icons other than the icon representing the data transfer method, and the controller causes the data transfer unit, when the touch panel receives, in a case where the plurality of the destinations are selected out of the list, the determination instruction with respect to one transfer method selected for one selected destination, to transfer the data to the selected destinations, using the one transfer method as the method of the data transfer to other destinations than the one destination, without the process through which the user selects the data transfer method for other destinations than the one destination, on the touch panel.

2. The data transfer apparatus according to claim 1, wherein the storage unit includes a storage region where the data is to be written, the data transfer unit includes:

a mail communicator that performs mail communication with an external device to which a mail address, stored in advance in the storage unit as the destination address, is allocated;

a communication interface that performs network communication with an external device to which an IP address, stored in advance in the storage unit as the destination address, is allocated;

a facsimile communicator that performs facsimile communication with an external device to which a facsimile number, stored in advance in the storage unit as the destination address, is allocated; and a data writer that writes the data in the storage region in the storage unit, indicated by position information stored in advance in the storage unit as the destination address, and the controller is configured to:

acquire, when the touch panel receives an instruction from the user to select the data transfer destination, and the mail communication as the data transfer method, the mail address of the selected destination from the storage unit, and cause the mail communicator to transfer the mail accompanied by the data, to the external device to which the acquired mail address is allocated;

acquire, when the touch panel receives the instruction from the user to select the data transfer destination, and the network communication as the data transfer method, the IP address of the selected destination from the storage unit, and cause the communication interface to transfer the data to the external device, to which the acquired IP address is allocated;

acquire, when the touch panel receives the instruction from the user to select the data transfer destination, and the facsimile communication as the data transfer method, the facsimile number of the selected destination from the storage unit, and cause the facsimile communicator to transfer the data to the external device to which the acquired facsimile number is allocated; and acquire, when the touch panel receives the instruction from the user to select the data transfer destination, and the data writing as the data transfer method, the position information of the selected destination from the storage unit, and cause the data writer to write the data in the storage region indicated by the acquired position information.

3. The data transfer apparatus according to claim 1, wherein, when the touch panel receives the determination instruction with respect to one data transfer method, the display controller causes the display unit to display, in the list, only the destinations, the address of which corresponding to the one data transfer method is stored in the storage unit.

4. The data transfer apparatus according to claim 2, wherein the display controller causes the display unit to display an icon corresponding to the type of the data transfer method, when causing the display unit to display the screen urging the user to select the method of the data transfer to the destination, and when it is detected through the touch panel that the user has pressed the icon, it is decided that the instruction to select the data transfer method, corresponding to the icon pressed by the user, has been inputted, and when it is detected through the touch panel that the user has held down the icon equal to or longer than a predetermined time, it is decided that the determination instruction has been inputted, for the data transfer method corresponding to the icon that has been held down.

5. The data transfer apparatus according to claim 4, wherein, when the touch panel receives an instruction to select one destination out of the plurality of the destinations included in the list, the display controller decides which of the mail address, the IP address, the facsimile number, and the position information is stored in the storage unit, as the address of the one destination selected through the touch panel, and when the display unit is to display the screen urging the user to select the method of the data transfer to the destination, as icons each corresponding to the type of the data transfer method, the display controller causes the display unit to display: the icon representing the mail communication when the mail address is stored in the storage unit; the icon representing the network communication when the IP address is stored in the storage unit; the icon representing the facsimile communication when the facsimile number is stored in the storage unit; and the icon representing the data writing when the position information is stored in the storage unit.

6. An image forming apparatus comprising:
the data transfer apparatus according to claim 1; and
an image forming unit that forms an image on a recording medium.

7. An image reading apparatus comprising:
the data transfer apparatus according to claim 1; and
a document reading unit that reads a source document,
wherein the data transfer apparatus is configured to transfer image data of the source document acquired through a reading operation of the document reading unit.

* * * * *